(12) United States Patent
Amitai et al.

(10) Patent No.: US 8,102,860 B2
(45) Date of Patent: Jan. 24, 2012

(54) SYSTEM AND METHOD OF CHANGING A NETWORK DESIGNATION IN RESPONSE TO DATA RECEIVED FROM A DEVICE

(75) Inventors: Ofer Amitai, Tel-Aviv (IL); Nir Aran, Raanana (IL)

(73) Assignee: Access Layers Ltd., Herzelia (IL)

( * ) Notice: Subject to any disclaimer, the term of this patent is extended or adjusted under 35 U.S.C. 154(b) by 251 days.

(21) Appl. No.: 11/606,009

(22) Filed: Nov. 30, 2006

(65) Prior Publication Data

US 2008/0133719 A1    Jun. 5, 2008

(51) Int. Cl.
*H04L 12/28* (2006.01)
*G06F 7/04* (2006.01)

(52) U.S. Cl. .......................... 370/395.53; 370/401; 726/3
(58) Field of Classification Search .................. None
See application file for complete search history.

(56) References Cited

U.S. PATENT DOCUMENTS

| | | | |
|---|---|---|---|
| 4,953,142 A | 8/1990 | Rimmer | |
| 5,805,801 A | 9/1998 | Holloway et al. | |
| 6,061,334 A | 5/2000 | Berlovitch et al. | |
| 6,061,346 A * | 5/2000 | Nordman | 370/352 |
| 6,085,238 A | 7/2000 | Yuasa et al. | |
| 6,334,056 B1 * | 12/2001 | Holmes et al. | 370/351 |
| 6,393,474 B1 | 5/2002 | Eichert et al. | |
| 6,611,863 B1 | 8/2003 | Banginwar | |
| 6,658,586 B1 | 12/2003 | Levi | |
| 6,775,290 B1 * | 8/2004 | Merchant et al. | 370/395.53 |
| 6,928,480 B1 * | 8/2005 | Gadagkar et al. | 370/395.53 |
| 6,947,739 B2 * | 9/2005 | Yokoyama | 370/353 |
| 7,194,004 B1 * | 3/2007 | Thomsen | 370/401 |
| 7,269,849 B2 * | 9/2007 | Savini | 370/351 |
| 7,292,577 B1 * | 11/2007 | Ginipalli et al. | 370/392 |
| 7,310,524 B2 * | 12/2007 | Kurokawa | 370/352 |
| 7,640,319 B1 * | 12/2009 | Sylvain et al. | 709/218 |
| 2002/0136226 A1 * | 9/2002 | Christoffel et al. | 370/401 |
| 2003/0069948 A1 * | 4/2003 | Ma et al. | 709/220 |
| 2004/0049588 A1 * | 3/2004 | Shinohara et al. | 709/229 |
| 2004/0076163 A1 * | 4/2004 | Ikeda | 370/395.53 |
| 2004/0202171 A1 * | 10/2004 | Hama | 370/401 |
| 2005/0007986 A1 * | 1/2005 | Malladi et al. | 370/342 |
| 2005/0064859 A1 * | 3/2005 | Kotzin et al. | 455/419 |
| 2006/0002351 A1 * | 1/2006 | Madour | 370/338 |
| 2006/0002426 A1 * | 1/2006 | Madour | 370/477 |
| 2006/0050659 A1 * | 3/2006 | Corson et al. | 370/310 |
| 2006/0104252 A1 * | 5/2006 | Song et al. | 370/338 |
| 2007/0115940 A1 * | 5/2007 | Kamen et al. | 370/352 |
| 2008/0046993 A1 * | 2/2008 | Mullick et al. | 726/15 |
| 2008/0069102 A1 * | 3/2008 | Koehler et al. | 370/401 |
| 2008/0148340 A1 * | 6/2008 | Powell et al. | 726/1 |

* cited by examiner

*Primary Examiner* — Chirag Shah
*Assistant Examiner* — Joshua Smith
(74) *Attorney, Agent, or Firm* — Pearl Cohen Zedek Latzer, LLP

(57) ABSTRACT

A method and system to create a virtual network to isolate a device connected to a port, and to change a designation of such network in response to identification data received from the device so as to provide the identified device with access to further areas of a network.

16 Claims, 2 Drawing Sheets

SYSTEM AND METHOD OF CHANGING A NETWORK DESIGNATION IN RESPONSE TO DATA RECEIVED FROM A DEVICE

FIELD OF THE INVENTION

The present invention relates to providing access to a network, and particularly to changing a designation of a network in response to identification data received from a device connected to a virtual network.

BACKGROUND OF THE INVENTION

Offices, campuses and other areas where users receive access to a network or network resources frequently have various ports or other connection locations where a user can plug in an electronic device such as a computer and receive access to a network or network resource. While logging onto a network may entail various identification procedures such as passwords or authorization protocols, an unauthorized intruder such as a visitor to an office who accesses a port connected to a secure network may damage or impair a computer system.

SUMMARY OF THE INVENTION

In some embodiments of the invention, a method may include designating a virtual first network that accepts a link with a device connected to a port, and that has or is assigned a first identifier; accepting information from the device; evaluating the information against a criteria; and upon satisfaction of the criteria by the information, changing the first identifier to a second identifier, where the second identifier identifies a second network. In some embodiments, accepting the information includes accepting information such as a media access control address associated with the device, an internet protocol address associated with the device, a product license of the device, an identifier associated with software on the device and an identifier associated with a user of the device. In some embodiments, a method may include querying the device from a network device connected to the virtual first network.

In some embodiments, designating the virtual first network may include designating the virtual first network with a designation that is recognized by a network device connected to the virtual first network. In some embodiments, comparing the information may include comparing information to a criteria in a policy server.

In some embodiments, connecting the device to the second network includes connecting the device to a resource of the second network, where the resource is available to the device only upon a satisfaction of the criteria.

In some embodiments, a method includes searching for an unwanted item on a memory of the device; and upon satisfaction of another criteria changing the second identifier to a third identifier, where the third identifier identifies a third network.

In some embodiments, designating a virtual first network includes designating the first virtual network so that the device, when connected to the first virtual network, has no access to the second network.

In some embodiments, accepting information from the device includes accepting an indication of a network resource used by the device; and connecting the device to the second network where the second network provides access to the network resource.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, and components have not been described in detail so as not to obscure the embodiments of the invention.

Unless specifically stated otherwise, as apparent from the following discussions, it is appreciated that throughout the specification, discussions utilizing terms such as "processing," "computing," "calculating," "determining," or the like, refer to the action and/or processes of a processor, computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer, communication device or other apparatus. The desired structure for a variety of these systems will appear from the description below. In addition, embodiments of the present invention are not described with reference to any particular programming language, machine code, etc. It will be appreciated that a variety of programming languages, machine codes, etc. may be used to implement the teachings of the invention as described herein. In some embodiments, a series of instructions such as for example software commands may be stored on a medium such as for example a memory device, and the executed instructions may perform an embodiment of the invention.

Some of the structures, units or functions described in this paper may be consolidated or divided into a greater or smaller number of units, structures or functions than are described herein.

Figure 1:
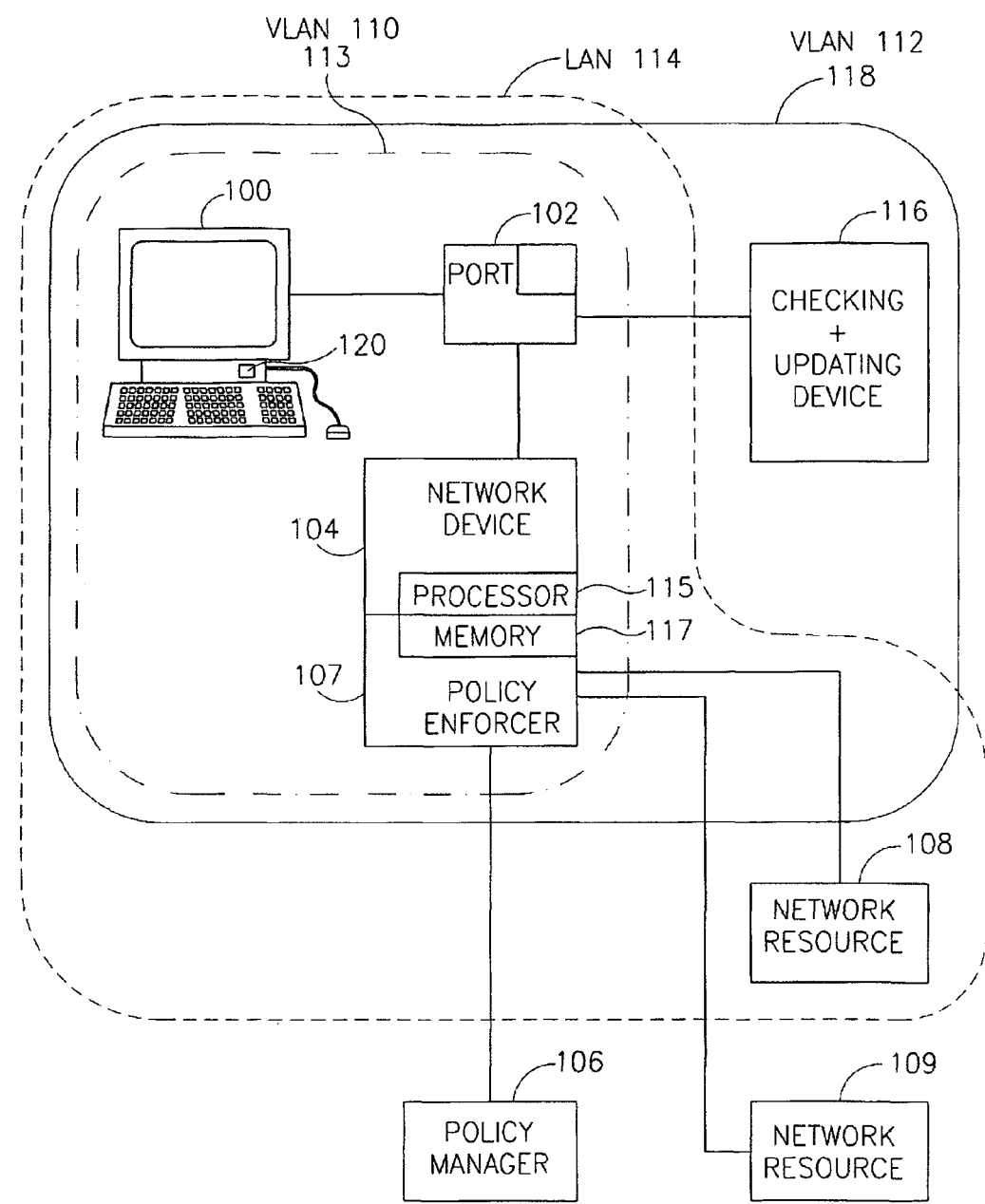
FIG. 1 is a conceptual illustration of a system to designate a virtual network that may link with a device connected to a port, and change a designation of the network when the connected device is identified or otherwise authorized to access a network or network resource, in accordance with an embodiment of the invention.

Reference is made to FIG. 1, a conceptual illustration of a system to designate a virtual network that may link with a device connected to a port, and change a designation of the network when the connected device is identified or otherwise authorized to access a network or network resource, in accordance with an embodiment of the invention. In some embodiments, an electronic device 100 such as for example a computer, internet telephone, laptop, server, switch, access point, personal digital assistant, email access device or other device, may connect or be connected to a network such as for example by plugging in to for example a port 102 or other outlet that may link to a network or network resource. In some embodiments, port 102 may provide a physical link such as wired connection to a network device 104 such as for example a switch, router, firewall, access point or server. In some embodiments, port 102 may be or include for example an access point to provide a wireless connection or a virtual port to a network device 104 or network resource component connected to a network, such as for example a policy enforcer 107, that may vary or change a network designation that is associated with device 100 or port 102. In some embodiments, policy enforcer 107 may be included in network device 104, and may create or designate first virtual network (VLAN) 110, that may serve for example as an inspection network or holding area that may include device 100 and port 102. Network device 104 may also have a connection to VLAN 110 and network device 104.

Policy enforcer 107 may include or be connected to a processor 115 and a memory 117.

In some embodiments upon connection of a device 100 to port 102 or an association of a device 100 with a network element, a notification or link up trap may be sent from network device 104 to for example policy enforcer 107. This notification message may include for example information indicating that a device 100 has connected with port 102, or may include other information. Policy enforcer 107 may upon receiving such notification or at some other time, configure port 102 or the associated connection between device 100 and an access point, to be a member of a holding or inspection area VLAN, such for example VLAN 110, such that the connected device 100 and port 102 and the policy enforcer 107 will be connected together, but such that device 100 will not have access to other resources of the local area network. While device 100 and port 102 are in VLAN 110, other network resources such as network resource 108, are not available to device 100, and no communication is established between device 100 and a second layer of communication that may be known as layer 2. Other numbers or VLAN designations may be used. In some embodiments, data, signals or packets with designation of VLAN 110 may be sent by, to and among device 100, port 102, network element 104 and policy enforcer 107, while data, signals or packets having designations other than VLAN 110 may not be sent to or received by device 100 or port 102.

The designation of for example VLAN 110 may be recognized by network device 104 as designating only for example an inspection network and devices connected to it. In FIG. 1, the elements included in inspection network that are included in for example VLAN 110, are conceptually illustrated by border 113. No such actual border need exist.

In some embodiments, policy enforcer may access more than one network or VLAN such as for example inspection network VLAN 110, updating network VLAN 112 or other VLANs.

In some embodiments, a trap such as an SNMP trap may carry to for example network element 104, data about the connected port 102, the session created, the association of a device 100, or other information related to the connection of device 100 and port 102. In some embodiments, policy enforcer 107, or some other component associated with a network, may gather information regarding layer 2, for example media access control (MAC) of the connected device 100. The method of collecting basic information regarding device 100 may include direct SNMP queries to device 100 to fetch the MAC address or other identifying information. Other methods may include common line interface or a proprietary interface of for example a switch vendor.

In some embodiments, policy enforcer 107, or some other component associated with a network, may use a DHCP relay, broadcast ARP scanner or other element or method to determine an IP address associated with device 100 and port 102.

When network element 104 may be aware of some or all of the MAC address and IP address of device 100, and of the identification of port 102 to which device 100 is connected, network communications may be established among device 100, port 102 and policy enforcer 107.

Policy enforcer 107 or some other component with access to for example the VLAN 110 or some other VLAN, may query device 100 for further data that may identify device 100 as qualified to receive access to a network resource 108. Such data or identifiers may include for example any, some or all of a license number for a particular software package that may be installed on device 100, a password or authorization code, a date that an operating system or other software on the device was last updated with an anti-virus package, a date that the device last logged onto a network, or other data by which device 100 may be identified or that may be compared with data stored on for example policy manager 106. In some embodiments, querying of device 100 by policy enforcer 107 or some other component may be achieved using for example expect language, WMI, SNMP, device fingerprint or other known method of device querying.

In some embodiments, network element 104 or another device may accept and for example record one, some or all of the data or information collected from device 100.

Policy enforcer 107 may query a policy server or policy manager 106 or other list, data base or set of rules or information to match one, some or all of the information collected from device 100 against the information stored or managed by policy manager 106. For example, and in some embodiments, policy manager 106 may include a list or data base of authorized devices 100, MAC addresses, software license numbers, IP addresses or other information by which device 100 may be identified. Policy manager 106 may include a policy that dictates that only devices that had been connected with a network during the past seven days or other time period may be granted access to a particular network or network resource 108. Similarly, policy manager 106 may include a rule that access to a network or network resource will be granted only to devices having an anti-virus program that has been updated within the last seven days or other time period. Other data or information collected from device 100 may be used to evaluate the satisfaction by device 100 with a criteria to determine whether a device is to be granted access to a network or network resource 108.

In some embodiments, upon an evaluation or comparison of data or information collected from device 100, and upon a satisfaction of one or more criteria that may be imposed by or included in policy manager 106, policy enforcer 107 may change a designation of port 102, or other connection or association of device 100, from being a member in VLAN 110 to being for example connected to for example VLAN 114. In FIG. 1, the elements included in a LAN that may participate in or be connected to VLAN 110 are conceptually illustrated in the area surrounded by border 114. The change in designation of port 102 from inspection network VLAN 110 to resource network VLAN 114 may let signals, packets or data sent to or received from device 100 or over port 102, reach other network resources 108. This change of designation may in effect grant device 100 with access to the wider network that may include one or more network resources 108.

In some embodiments, network resource 108 may be or include for example a data base, communication line, software package or other device, memory or processor that may be connected to or accessible by way of a network. For example, network resource 108 may be or include a financial data base whose access is to be limited to specific individuals in an organization. In some embodiments, when for example policy enforcer 107 determines that data collected from device 100 matches a particular criteria applicable to a grant of access to the particular data, policy enforcer 107 may change the LAN designation that includes device 100 and port 102, to include a virtual LAN that provides access to network resource 108. Similarly, policy enforcer 107 may designate device 100 and port 102 to be included in a virtual LAN that provides access to some network resources 108, but does not provide access to other network resources 109.

In some embodiments, data and information collected from device 100 over port 102 may indicate that device 100 is or includes a particular kind of electronic device or a particular user who may be requesting access. For example, collected data from a device 1100 may indicate that device 100 is an IP phone or that the device 100 is being used in an office of for example a vice president of marketing who needs fast internet service. Policy manager 106 may include a criteria indicating that the device 100 operated by the marketing VP is to be given access to a particular quality of service, and fulfillment of such requirement might be achieved by granting access to resources that meet the needs of such device 100 through a change of a virtual network designation to a designation that is associated with a VLAN that includes such resources. Upon such determination, policy enforcer 107 may change a LAN designation so that device 100 connected to port 102 is included in a VLAN that includes a network resource such as a high speed internet link to meet the required QOS. Such VLAN may for example exclude certain other network resources 109 that are not needed by a particular user or device 100. Other virtual LANs may be created and designated to provide a device 100 with access to one, some, or all network resources 108.

In some embodiments, data collected from device 100 may indicate that a software package in a memory 120 of device 100, such as for example an anti-virus program, on device 100 has not been recently updated. Upon satisfaction of a particular criteria, policy enforcer 107 may change a designation of a LAN that includes only for example device 100, port 102 and network device 104, to a designation of a LAN that also or instead includes a software checking/updating device 166. Such "updating network" VLAN 112 is conceptually shown on FIG. 1 to include the items in border 118. Such device 110 may be or include for example an anti-virus server, patch server or a server that may execute for example a virus check on device 100, and that may update a program or package in device 100. In some embodiments when such check or update is complete, a further query by the policy enforcer 107 may be made of device 100, and upon satisfaction of a criteria, a further change may be made to the designation of the virtual LAN, and device 100 may thereby be provided with access to a rest of the LAN.

In some embodiments, a virus checker or other security or identity mechanism on a network may detect that a particular device 100 is infected with a virus or other unwanted item, or is otherwise to be excluded from access to a network resource 108. In some embodiments, a message may be sent to policy enforcer 107, by email, trap, or other suitable form of communication and in response, policy enforcer 107 may change a LAN designation of for example the device 100 and port 102 to which device 100 is connected. Such change of designation may result in membership or connection of the device in a virtual LAN that isolates device 100 and its port 102 connection, to stop for example infection of the rest of a network.

In some embodiments, there need not be a specific or additional security device between port 102 and network element 104 to block an access of device 100 from the network. The designation of a virtual network 110 that may include port 102, device 100 and network element 104, and that may be different from a designation of other resources of the network may exclude device 100 from accessing those other network resources.

Figure 2:
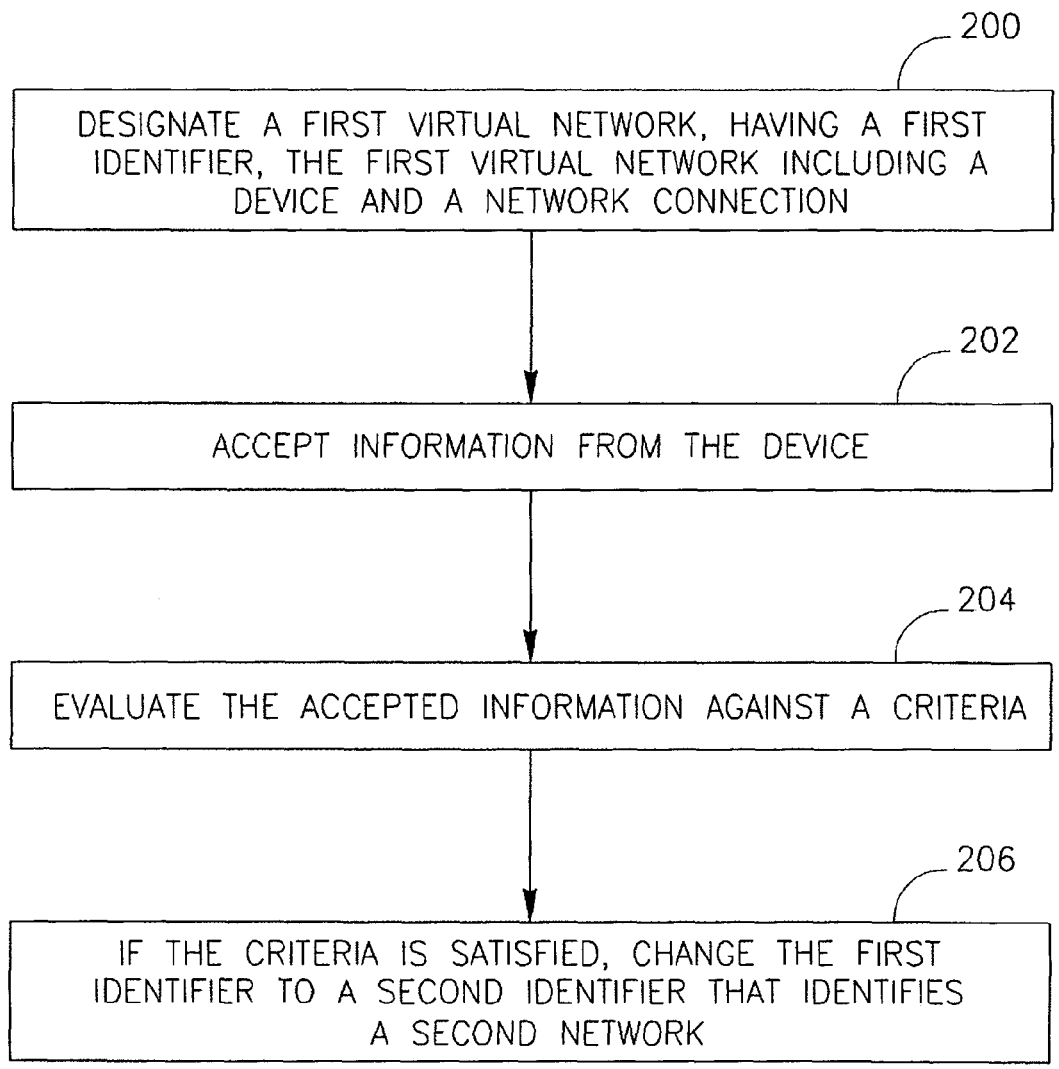
FIG. 2 is a flow diagram of a method in accordance with an embodiment of the invention.

Reference is made to FIG. 2, a flow diagram of a method in accordance with an embodiment of the invention. In block 200 a device may be plugged into for example a port or may otherwise be connected or associated with an access point or connection of a network. A first virtual network may be created or designated as including the device, the port or access point. A network device may be provided access to the first virtual network, and the first virtual network may be assigned a first identifier. The first identifier may accept and direct packets or other signals only to and from devices or ports that are included in or connected to the first virtual network so that the device that is plugged into the port will not have access to or from other network resources.

In block 202, data or information may be received from the connected device. The data may be received in response to a query by a network device, or the data may be gleaned from a packet or other signal that may be transmitted by the device to the port or the first virtual network. The data may be identifying data of the device such as for example a MAC address, IP address or other specific number or may be data about the usage or connectivity history of the device, data about a user of the device such as a travel plan, home or office location of the usual user of the device, a product license number or other identifier of a software on the device.

In block 204, the accepted information may be evaluated against a pre-defined criteria. For example, a policy server may have a list of all the IP addresses or MAC addresses or computers that are to be given access to the network, and the IP or MAC address of the device may be compared to the list in the policy server. A policy server may include a policy regarding what resources are to be accessed by which computer or which computers have updated software or have been checked for viruses. Other policies may be checked or evaluated.

In block 206, if the criteria is met, a policy enforcer that may be for example a component of part of a network device may change the identifier that was designated for the first virtual network to an identifier that matches a wider or broader network that may include resources beyond the device, the port and the network device.

In block 208, the changed designation may allow the device to access other areas or resources of a network or other networks.

In some embodiments, a first identifier may for example be changed to a second identifier, where the second identifier designates a second virtual network that may include another device that may check or review a memory of the connected device to determine if it has adequate software or is infected with an unwanted item such as a virus. The device in the second virtual network may clean or update the connected device, and then the network designation may be changed again to give the connected device access to a wider network.

In some embodiments, a policy dictates that a port may be shut down completely if an authorized device attempts to gain access from such port. In some embodiments such port may be reactivated only by an authorized administrator. In some embodiments, an unauthorized device may be granted access to certain network resources such as for example web-access or other resources that may be available to visitors.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

We claim:

1. A method of determining whether to grant to an electronic device access to a local area network associated with a second port network identifier, the method comprising:
designating by a network device a virtual inspection network, wherein said virtual inspection network is associated with a first port network identifier;
upon connection of said electronic device to a port connected to said network device, associating said electronic device with said virtual inspection network by providing said first port network identifier by said network device to packets sent from said port;
accepting by said network device information from said electronic device;
determining based on said information whether said electronic device satisfies a criteria for granting access to said local area network, while said electronic device is connected to said port; and
upon determination that said electronic device satisfies said criteria, granting to said electronic device access to said local area network, by changing said first port network identifier associated with said inspection network to said second port network identifier associated with said local area network, thus associating said electronic device with said local area network.

2. The method as in claim 1, wherein accepting said information comprises accepting information selected from the group consisting of a media access control address associated with said device, an internet protocol address associated with said device, a product license of said device, an identifier associated with software on said device, and an identifier associated with a user of said device.

3. The method as in claim 1, comprising querying said device by said network device.

4. The method as in claim 1, wherein said determining comprises comparing said information to said criteria in a policy server comprised in said network device.

5. The method as in claim 1, comprising making connection to a resource of said local area network available for said electronic device upon determination that said electronic device satisfies said criteria.

6. The method as in claim 1, comprising
searching for an unwanted item on a memory of said device; and
upon satisfaction of another criteria changing said second identifier to a third identifier, said third identifier identifying a second network.

7. The method as in claim 1, wherein said accepting said information from said device comprises accepting an indication of a network resource used by said device; and wherein said granting to said device access to said network comprises connecting said device to said network resource.

8. The method as in claim 1, wherein said accepting said information from said device comprises accepting an indication of a quality of service required by said device.

9. An article comprising a non-transitory computer-readable storage medium having stored thereon software commands that, when executed by a processor, result in determining whether to grant to an electronic device access to a local area network associated with a second layer 2 identifier by:
designating by a network device a virtual inspection network, said virtual inspection network is associated with a first layer 2 identifier;
upon connection of said electronic device to a port connected to said network device, associating said electronic device with said virtual inspection network by providing said first layer 2 identifier by said network device;
accepting information from said electronic device;
determining based on said information whether said electronic device satisfies a criteria for granting access to said local area network, while said electronic device is connected to said port; and
upon determination that said electronic device satisfies said criteria, granting to said electronic device access to said local area network, by changing said first layer 2 identifier to said second layer 2 identifier, thus associating said electronic device with said local area network.

10. The article as in claim 9, wherein accepting said information comprises accepting information selected from the group consisting of a media access control address associated with said device, an internet protocol address associated with said device, a product license of said device, an identifier associated with software on said device, and an identifier associated with a user of said device.

11. The article as in claim 9, wherein said execution of said software commands further result in querying said device by said network device.

12. The article as in claim 9, wherein said determining comprises evaluating said information against a criteria in a policy server comprised in said network device.

13. The article as in claim 9, wherein said execution of said software commands further results in making connection to a resource of said local area network available for said electronic device upon determination that said electronic device satisfies said criteria.

14. The article as in claim 9, wherein said execution of said software commands further results in,
searching for an unwanted item on a memory of said device; and
upon satisfaction of another criteria changing said second identifier to a third identifier, said third identifier identifying a second network.

15. The article as in claim 9, wherein said accepting said information from said device comprises accepting an indication of a network resource used by said device; and wherein said granting to said device access to said network, comprises connecting said device to said network, said network providing access to said network resource.

16. The article as in claim 9, wherein said accepting said information from said device comprises accepting an indication of a quality of service required by said device.

* * * * *